United States Patent [19]

Boirin et al.

[11] 4,289,435
[45] Sep. 15, 1981

[54] AUTOMATIC BALE WAGON

[75] Inventors: Jean-Claude A. E. Boirin, Pontailler sur Saone; Jean-Pierre Guenon, Plombieres-lez-Dijon, both of France

[73] Assignee: Sperry Corporation, New Holland, Pa.

[21] Appl. No.: 65,023

[22] Filed: Aug. 9, 1979

[30] Foreign Application Priority Data

Aug. 16, 1978 [GB] United Kingdom ............... 33512/78

[51] Int. Cl.³ .................. A01D 87/12; B65G 57/32
[52] U.S. Cl. ................................... 414/39; 414/907
[58] Field of Search .............. 414/35, 36, 38, 39, 414/40, 44, 107, 680, 907, 111; 271/180, 181; 100/188 R

[56] References Cited

U.S. PATENT DOCUMENTS

| 2,659,907 | 11/1953 | Kramer | 271/181 X |
| 3,502,230 | 3/1970 | Grey et al. | 414/39 X |
| 3,651,962 | 3/1972 | Arnemann | 414/907 X |
| 3,754,668 | 8/1973 | Butler | 414/39 X |
| 3,807,580 | 4/1974 | Cook et al. | |
| 4,119,218 | 10/1978 | Guenon | 414/39 |
| 4,190,392 | 2/1980 | Butler | 414/39 |

FOREIGN PATENT DOCUMENTS 376051 5/1973 U.S.S.R. .............................. 414/39

Primary Examiner—Leslie J. Paperner
Attorney, Agent, or Firm—Larry W. Miller; Frank A. Seemar; James R. Bell

[57] ABSTRACT

A bale wagon comprising a load bed for accommodating a stack of bales comprising a plurality of tiers of bales, and a bale transfer table for accumulating bales thereon to form tiers of bales and operable to deposit successively formed tiers of bales on the load bed. The transfer table has a convex load surface to improve the stability of the bale stack formed on the load bed.

7 Claims, 4 Drawing Figures

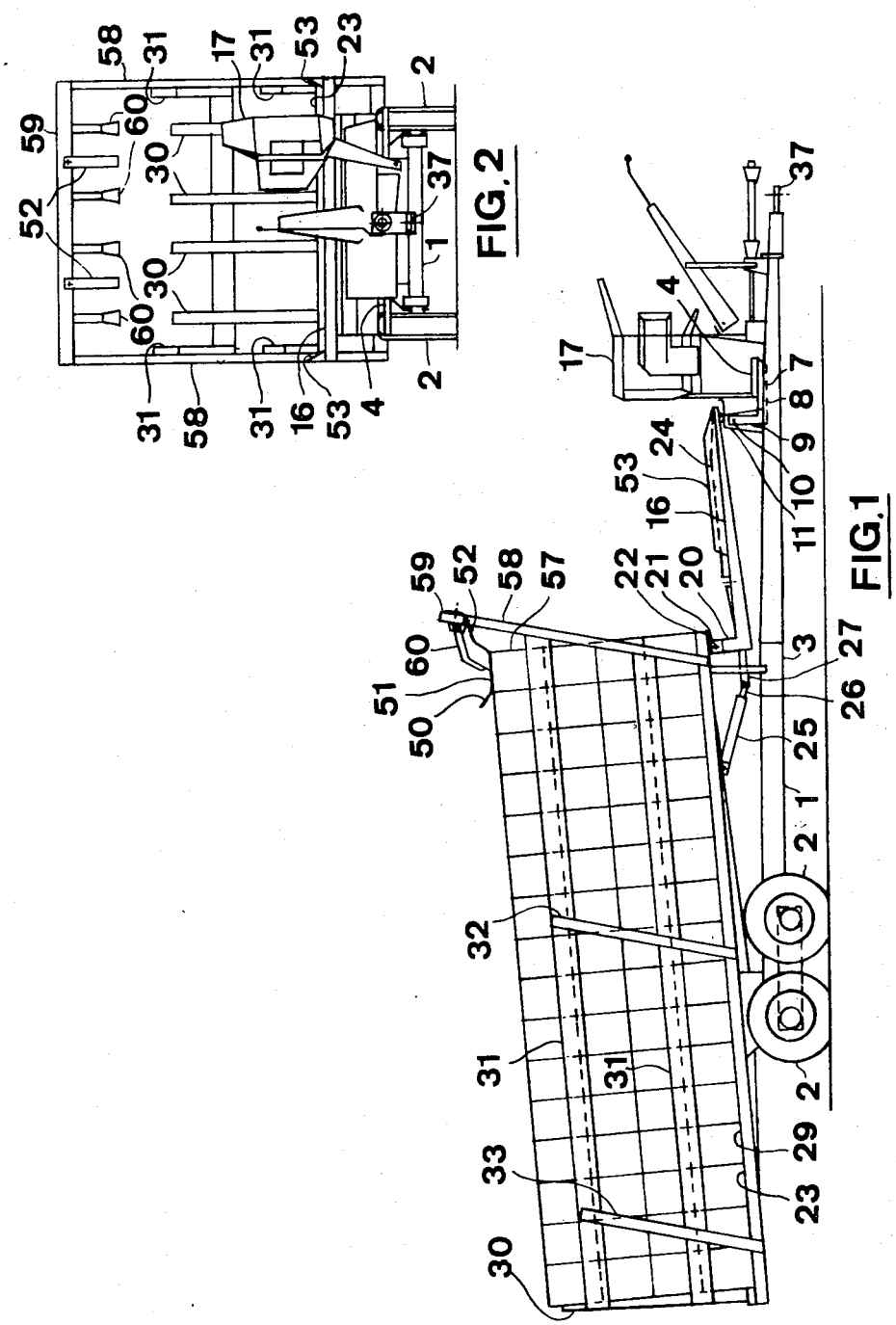

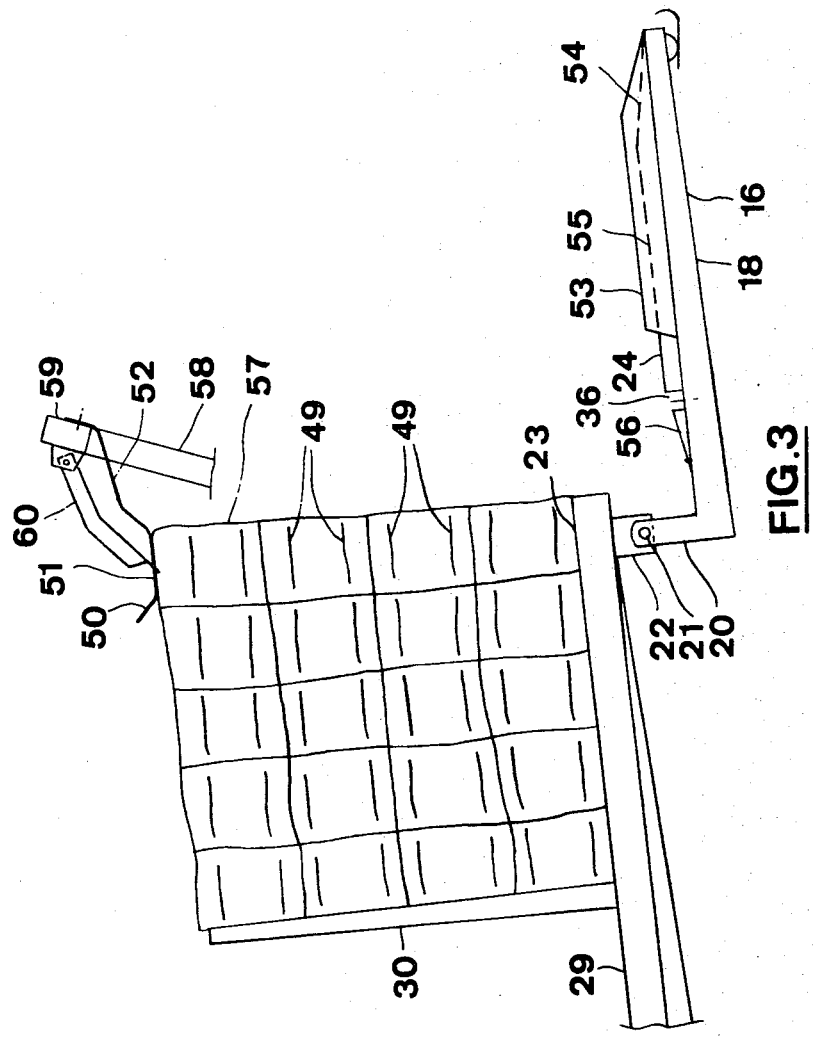

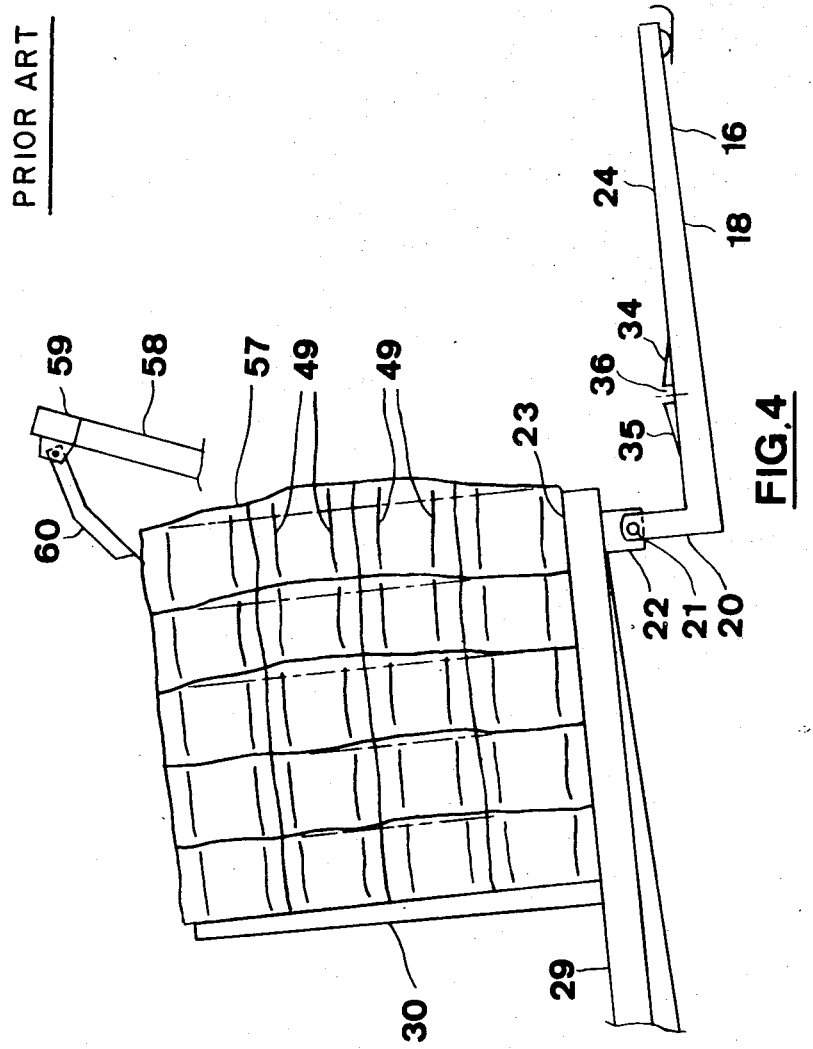

AUTOMATIC BALE WAGON

BACKGROUND OF THE INVENTION

1. Field of the Invention

The present invention relates generally to agricultural equipment and more specifically to automatic bale wagons.

2. Description of the Prior Art

With the trend in farming practices towards increased mechanization, the automatic bale wagon, such as the type illustrated in U.S. Pat. No. 3,706,389, has been gaining acceptance as an essential farm implement. In these bale wagons, a pick-up mechanism lifts bales from the ground and loads them onto a first or receiving table, which sequentially moves two or more bales in end-to-end relationship onto a second or transfer table upon which a tier of bales is accumulated comprising a plurality of rows of bales (e.g. 4 rows). When a full complement of bales for a tier has been loaded upon the second table, the latter is pivoted from an almost horizontal position, about a transverse pivot axis, to a substantially vertical position to dispose the tier of bales either against a rolling rack upon a load bed of the wagon or against the forward face of a previously deposited tier of bales on the load bed. The load bed is positioned rearwardly of the second or transfer table, extends in a generally fore-and-aft direction and has its loading end facing in a forward direction. The transfer or second table with the tier of bales thereon pushes the rolling rack, together with any partially formed stack of bales, towards the rear of the wagon over the width of one bale so that a further tier can be transferred from the second table to the forward end of the load bed.

After accumulating successive bale tiers on the load bed to form a complete bale stack thereon, the stack may be transported to a desired location for discharge from the wagon in a composite stack. However, bale wagons have been evolved which can unload a stack one bale at a time. In this latter development, when bales are unloaded one by one, the second transfer table is placed in an inclined (45°) position and the load on the load bed is caused to move in a forward direction step by step in a manner so that the forwardmost tier falls back onto the inclined transfer table. Unloading means on the transfer table unload the bales one by one in a sideways direction.

All operations of the various receiving and transfer tables, rolling rack, and the final unloading of the load bed are accomplished by hydraulic means and associated fluid circuits and control valves which are operated by appropriate cams, trip members and other means such as described in detail in the aforementioned patent specification.

Bale wagons of the types hereinbefore described are satisfactory when operating in generally flat fields. However, when using these bale wagons in hilly conditions, certain problems are encountered. One problem occurs when operating the bale wagon on a downward incline. It should be noted here that the front tier of bales on the load bed is held only by means engaging the uppermost bales, inter-bale friction being relied on to retain the intermediate bales and friction between the lowermost bales and the load bed being relied on to retain the lowermost bales. The upper bales may be contacted from above and on their upper surface by resiliently-loaded bale fingers tending to prevent the tier from falling back on the transfer table. It has been found in practice that the intermediate rows of bales occasionally slip in a forward direction, especially when the machine is operated on a downward incline, with the result that the front tier either adopts a curved profile or the tier actually falls from the load bed.

Should the front tier of bales fall from the load bed, the automatic operation of the wagon is disrupted and any bales falling on the transfer table have to be removed, or rearranged if in fact they can be accommodated thereon and the remaining bales of the now partial front tier have to be removed manually. If the front tier does not integrate but adopts a curved profile, subsequent tiers are likely to adopt a similar profile with the result that an unstable stack is formed.

One solution that has been attempted involves leaving the transfer table in the upper position after completing the loading of bales and whilst the wagon is driven to the desired discharge location. This, however, solves only part of the problem since it is necessary to keep the transfer table in its generally horizontal position during the appropriate part of the loading operation and the discussed problems can arise at this time. When unloading the wagon one bale at a time, the bale retainer fingers holding the top bales of a tier must be retracted so that the load can be moved in a forward direction. This means that during unloading even the top bales are no longer positively held in position which increases the risk of the front tier falling (partially or completely) onto the transfer table prematurely, especially since the wagon undergoes considerable vibration when a tier is moved intentionally from the load bed to the transfer table and the vibration can disturb the new front tier. The foregoing problem is aggravated when bales are stacked on their edge on the load bed rather than flat. Usually bales are 14 inches (35 cms) or 16 inches (40 cms) high, 18 inches (45 cms) wide and about 40 inches (90 cms) long. Twine is wrapped around each bale lengthwise and around the 18 inch edges. Stacking bales flat means that the bales are stacked with the 18 inch edges parallel to the load floor, whilst stacking bales on edge means that the 18 inch edges extend perpendicular to the load floor. Bales tend better to resist deformation when stacked flat rather than when stacked on their edges. Nevertheless, it is preferred to stack bales on their edges on the load bed since more bales can be accommodated on a bale wagon of given length and width. For example, it is possible to load sixteen tiers of eight 14 inch by 18 inch bales on a load bed of given length and width provided the bales are arranged on their edge. If however, the bales are stacked flat the same load bed can only hold twelve tiers. When each tier comprises four rows of two bales, this means 128 bales in the first situation against only 96 bales in the second situation. This also means, of course, that the height of the stack when on the load bed varies accordingly. Also the fore-and-aft dimension of the second or transfer table has to be somewhat larger in the former situation than in the latter situation. Now, given the situation where bales are stacked on their edge of the load bed, the stability of the four bale high stack, and especially of the front tier of the stack, is inferior for several reasons, namely (a) increased height of the tiers and correspondingly increased distance between the load bed and the bale retainer fingers, (b) decreased surface area upon which the bales rest, (c) reduced resistance of the bales against deformation—i.e. the bales are more flexible and subject to compression when stacked on their edges. Also, with an increased capacity of the load bed, a higher force has to be exerted by the second or transfer table on the bale stack already on the load bed to shift the latter further rearwardly so as to be able to deposit a further tier thereon. This is particularly true when the load bed is almost completely loaded and the result is that the bales, especially those of the last few tiers loaded on the load bed, are compressed substantially. When the transfer table is subsequently returned to its receiving position, these compressed bales, especially the middle ones of the tier, tend to revert to their original size by expanding in a forward direction and hence giving the tier a curved profile with the attendant problems already discussed.

SUMMARY OF THE INVENTION

It is the object of the present invention to overcome or to attenuate one or more of the foregoing disadvantages. More precisely, it is the object to improve the bale stability on the load bed, especially when bales are stacked thereon on their edges, for operation on hillsides.

According to the present invention a bale wagon comprises a load bed for holding stacked bales thereon, and a transfer table operable to accumulate bales thereon and then deposit the accumulated bales onto the load bed, the transfer table comprising a curved load surface on which the bales are accumulated.

Preferably the curved load surface of the transfer table is generally convex. To facilitate manufacture of the transfer table, the generally convex surface thereof may be composed of three individually flat sections, a forward section extending upwardly and rearwardly from a forward edge of the transfer table, and a rear section extending upwardly and forwardly from a rear edge of the table. The middle section extends generally parallel to the table preferably at a height of about 1.75 inches (4.5 cms) to 2 inches (5 cms) above the level defined by the front and rear edges of the table. The middle section preferably has a fore-and-aft dimension generally equal to the height of two bales. The forward and rearward sections of the table may each have a fore-and-aft dimension generally equal to the height of one bale.

The provision of a curved surface on the transfer table enables this table to push harder on the middle bales of a tier whilst depositing that tier on the load bed. Thus the middle bales will be positioned further rearwardly than the upper and lower bales whilst the transfer table is in the raised position. This is particularly true when the stack on the load bed already comprises a certain number of tiers. When subsequently the transfer table is lowered and the middle bales expand in a forward direction, the stack will have a relatively straight front face rather than a curved face. Thus a stack with a substantially improved stability is obtained.

A narrow transverse recess may be provided between the middle section and the rear section of the transfer table to house therein a transverse conveyor chain used for unloading the wagon one bale at a time. The transfer table may further comprise a pair of fore-and-aft extending side edges extending above the upper surface of the transfer table to prevent bales sliding off the table when the wagon is operating on transverse inclines.

The wagon may further include bale retainer means comprising rigid means operable to contact and retain the upper bales of the front tier on the load bed during the loading cycle and retractable to release said bales during the unloading cycle, and resilient means operable to retain the upper bales of the front tier on the load bed prior to it being moved to the transfer table for unloading. Preferably the resilient means are elongate leafsprings extending rearwardly from a mounting frame on the forward end of the load bed. The mounting frame bridges the loading opening of the load bed and also supports the retractable rigid bale retainer means. The leafsprings may have an upwardly curved rear end and are operable to contact the top bales of at least the front tier on the load bed, intermediate its ends. These leafsprings may be arranged also to contact the top bales of the second tier. The arrangement is such that on the one hand the bales can slide either in a forward direction or a rearward direction underneath the leafsprings when the appropriate force is applied to the bale stack whilst on the other hand the leafsprings are operable to retain the top bales prior to it being moved to the transfer table for unloading.

BRIEF DESCRIPTION OF THE DRAWINGS

A bale wagon embodying the present invention will now be described in greater detail, by way of example, with reference to the accompanying drawings in which:

FIG. 1 is a side elevational view of the bale wagon with the load bed fully loaded and with the bale pick-up means in a raised, transport position, FIG. 2 is a front view of the bale wagon of FIG. 1 but with an empty load bed, FIG. 3 is a partial schematic view, on a larger scale of FIG. 1, and FIG. 4 is a view similar to FIG. 3 but illustrating one problem which the present invention solves.

DETAILED DESCRIPTION OF THE PREFERRED EMBODIMENT

In the following description right-hand, left-hand, forward, and rearward references are determined by standing at the rear of the bale wagon and facing in the direction of operative travel.

The basic features of the bale wagon to be described are set forth hereinafter to an extent sufficient for the present invention to be appreciated and understood. However, certain components, in particular the hydraulic system by which the various elements of the bale wagon are activated and controlled, are shown only diagrammatically. Operation of certain of these components, especially the control valves for the hydraulic cylinder units, is initiated by certain trip mechanisms, cams, etc., the details of which are not shown in the drawings of the present application but are illustrated and described in U.S. Pat. No. 3,706,389 to which attention is directed for a more complete description and illustration of the same.

Referring to the accompanying drawings and particularly to FIG. 1, the bale wagon comprises a chassis, indicated generally at 1, mounted on two pairs of wheels, only the right-hand ones 2 being seen in FIG. 1. The chassis 1 is formed from left- and righthand, longitudinally-extending rails 3 of which only one is seen. The forward ends of the longitudinally extending rails 3 converge in a hitch assembly 37 which adapts the wagon to be secured to a tractor (not shown), or other towing vehicle, located at the front thereof. Power for the wagon is obtained from the tractor power-take-off in a conventional manner, but not specifically shown.

Mounted at the forward end of the chassis 1 and extending transversely thereof is a first or receiving table 4 which is mounted on a forwardly-extending, horizontal portion 7 of an L-shaped structure indicated generally at 8. The L-shaped structure 8 includes a rear, upwardly-extending leg portion 9 pivotally mounted at 10 on spaced brackets 11, only one of which is shown, mounted on the right- and left-hand side rails 3. A hydraulic cylinder (not shown) is pivotally secured at one end by a pivot pin to the framework of the bale wagon and at the other end to the L-shaped member 8 of the receiving table 4. As the cylinder is extended, the receiving table 4 is swung upwardly about its pivot point 10, thereby transferring any bales which have been accumulated on the table onto a second, or transfer, table 16.

It will be understood by those skilled in the art that the bales are first introduced to the receiving table 4 by means of a pick-up mechanism 17 which lifts bales from the ground and directs them to the receiving table 4. The pick-up mechanism 17 is shown in its raised, transport position in FIGS. 1 and 2.

The transfer table 16 is also mounted on a pair of L-shaped structures 18 each having a forwardly-extending leg portion and an upwardly-extending rear leg portion 20 which is disposed at right angles to the lower leg portion. Each of the upwardly-extending leg portions 20 is secured by a pivot pin 21 to a depending lug 22 mounted on the forward end of the load bed 23.

A load surface 24 of the transfer table 16 is formed across the forwardly-extending leg portions and provides a surface upon which bale tiers are formed. When the transfer table 16 is in its normal tier-forming position, it is disposed in the position shown in the drawings. A hydraulic actuator 25 (FIG. 1) is secured by a pivot pin to the load bed 23, with the rod end 26 of the actuator pivotally connected by a pivot pin to a rearwardly-extending member 27 fixed at its forward end to the rear portion of the adjacent L-shaped structure 18. The load bed 23 includes a platform assembly 29.

When the requisite number of bales has been accumulated on the transfer table 16 from the receiving table 4, to form a first tier of bales thereon, the hydraulic actuator 25 is operated by trip means (not shown) so that it extends and causes the table 16 to swing upwardly about its pivot pin 21 through approximately 90°. In this way the first bale tier formed on the transfer table 16 is transferred from a generally horizontal position on the table 16 to a generally vertical position on load bed 23 against a rolling rack 30 which is thus forced rearwardly. Successive tiers of bales placed on the load bed 23 by the table 16 will effect further rearward movement of the rack 30 relative to the load bed 23. The bale tiers are laterally confined on the load bed 23 by right- and left-hand side bars 31, only the right-hand one being shown in FIG. 1. Each of the side bars 31 is supported by upwardly-extending front and rear struts 32 and 33, respectively.

The rolling rack 30 is adapted to be advanced forwardly and rearwardly by means of a cable system (not shown). When the operator of the bale wagon desires to unload the wagon one bale at a time, the bale tier last deposited on the load bed 23 is transferred back to the now inclined transfer table 16 by forward movement of the rolling rack 23. A cross conveyor (not shown) engages the end bale of the lowermost layer of bales and discharges it from the bale wagon. Bale-engaging means (not shown) have previously engaged the layer of bales next to the lowermost layer on the transfer table 16 and shifted them upwardly on the bed surface 24 to permit ready discharge of the lowermost layer. When the lowermost layer has been discharged, the bale-engaging means are retracted to allow the previously retained layer to fall and become the lowermost layer for discharge, the bale-engaging means then engaging and lifting the next layer. This operation is repeated until the whole tier has been discharged, whereupon the rolling rack is moved further forward to transfer the next tier onto the table 16.

With particular reference to FIG. 4, the prior art structure and its disadvantages will now be described in more detail. The second or transfer table 16 of known automatic bale wagons usually has a flat upper surface 24 with two inclined sections 34 and 35 defining a recess 36 to accommodate the chain of the transverse unloading conveyor. The provision of the inclined sections 34 and 35 is intended to prevent the bales hitting the chain and the chain getting plugged or blocked with straw or hay. Therefore the sections 34 and 35 are only provided at the rearmost end of the transfer table, i.e. at the location corresponding to the position of the lowermost bales of each tier as deposited on the load bed.

Known bale wagons have been provided with rearwardly-projecting bale-retainer fingers 60 pivotally mounted on a transverse member 59 extending between the upper ends of struts 58. The struts 58, together with the transverse member 59, define the forward loading opening of the load bed. The fingers 60 rest merely under their own weight on the top bales of the front tier 57 of bales deposited on the load bed 23 and are intended to prevent the tier 57 from falling back onto the transfer table 16.

FIG. 4 illustrates what can happen with the front tier when the wagon is operating on a downward incline. The intermediate layer or layers of bales of the front tier may slide forwardly and form an irregular tier. If the loading operation is continued with tier 57 in the condition illustrated in FIG. 4, a loose, irregular and unsatisfactory stack of bales is likely to result. The problem is even worse when the front tier falls back on to the transfer table 16 because the operation of the wagon is then interrupted and the operator has manually to unload and then reload the tier. Thus the automatic operation of the wagon is totally disrupted.

The risk of this problem arising is increased when the bales are stacked on their edge on the load bed 23 as is shown in FIG. 4, the twine binding the bales being indicated at 49. The reasons for this increased risk have been explained above and therefore will not be repeated. However, it should be noted that the front tier 57 may take the curved profile of FIG. 4 even when the bale wagon is operated on horizontal ground.

A solution to the problem is shown in FIGS. 1 and 3 in which the transfer table 16 has a generally convex load surface 24 comprising, for ease of manufacture, three flat sections 54, 55 and 56. The front and rear sections 54 and 56 extend from the respective edges of the transfer table 16 towards the middle and are inclined slightly upwardly. The fore-and-aft dimension of the inclined sections 54 and 56 is approximately equal to the height of one bale, i.e. 18 inches (45 cms). The middle or intermediate section 55 extends generally parallel to the plane defined by the front and rear edges of the transfer table 16 and at a height of about 1.75 inches (4.5 cms) to 2 inches (5 cms) above said plane. The fore-and-aft dimension of the intermediate section 55 is generally equal to twice the height of an average bale, i.e. about 36 inches (90 cms). A transverse recess 36 for housing the transverse unloading conveyor may be provided in the rear inclined floor section 56. In order further to facilitate manufacture, this recess may be provided between the floor sections 55 and 56, in which case the middle floor section 55 is extended somewhat to the rear, and the rear section 56 is shortened somewhat. In practice this design has proved satisfactory.

The second or transfer table 16 also comprises a pair of opposed, fore-and-aft extending side edges 53 which extend above the level of the load surface 24 and which serve to prevent bales sliding off the table during side hill operation.

Also, in addition to the bale retainer fingers 60, a pair of special shaped leaf-springs 52 is provided which extend in a rearward and downward direction from the transverse member 59 and which have sections 51 intermediate their ends arranged continually (even during the unloading process) resiliently to press on the top edge of the top bales of the front tier 57. The leaf springs 52 have rear ends 50 which are bent upwardly and away from the bale stack so that when the latter is moved forwardly the leafsprings will not penetrate the bales passing thereunder. The leafsprings 52 may be arranged to contact the top bales in the second tier on the load bed in addition to the top bales of the first or front tier.

OPERATION

In operation, the bale wagon is pulled over a field with bales spread there across. The pick-up mechanism 17 is positioned in the operative position and the necessary components energized or driven. The pick-up mechanism 17 lifts the bales which lie flat on the ground and positions two or more (usually only two) in an end-to-end relationship in a transverse direction onto the receiving table 4. When a layer is fully completed on the receiving table 4, a trip mechanism (not shown) is actuated, whereupon the table 4 is pivoted over substantially 90° about pivot 10 to place the layer of bales onto the forward portion of the transfer table 16. This is repeated several times (usually four times) until a tier is completed on the transfer table 16. Each time a further layer is deposited on the transfer table 16, that further layer pushes the layer of bales previously deposited on the transfer table further rearwardly thereon. When a complete tier is accumulated on the transfer table 16, the bales of the tier take up a convex profile, due to the convex nature of the load surface 24. Each time a tier is completed, a further trip mechanism (also not shown) is actuated, causing the transfer table to pivot over substantially 90° about the pivot 21 to deposit the tier on the load bed 23 either against the rolling rack 30 or against the tier previously placed on the load bed. During these cycles, the rolling rack, together with the partial stack already formed thereagainst, is pushed further rearwardly over the load bed by the action of the transfer table 16 depositing a new tier on the load bed 23. During this loading cycle the tiers of bales move beneath and past the bale retainer fingers 60 and the leafsprings 52, with the fingers and springs remaining in contact with the top bales of the front tier. The fingers 60, and to a lesser extent the leafsprings 52, prevent the front tier from falling back on the transfer table 16 even when the wagon is operating downhill.

When a new tier of bales is deposited on the load bed, especially when the latter already supports a number of tiers, the new tier and the previously loaded tiers are compressed. The middle bales of each tier are compressed more than the others due to the convex profile of the load surface 24 of the transfer table 16. As a result, the front tier takes a concave front profile as long as the transfer table 16 remains in the raised position. When the transfer table 16 is lowered, the stack of bales, and more especially the middle bales of the front tier, tend to revert to their previous size by expanding towards the front so that in the result the stack takes up a generally straight front face. The lower and upper bales will indeed expand less or not at all as they are held in position by the frictional contact with the load bed surface and the bale retainer fingers 60, respectively.

It is thus seen that the present invention provides a stack of bales having a substantially improved stability.

To unload the bale wagon, the transfer table 16 is placed in a 45° position as is known in the art. The bale retainer fingers 60 are retracted and the stack on the load bed is pushed step by step in a forward direction so as to let one tier at a time fall onto the inclined transfer table. The unloading conveyor means on the transfer table then unloads the bales one at a time. During this unloading cycle the specially shaped leafsprings 52 remain in contact with the upper surfaces of the top bales of the front tier and prevent that tier from falling prematurely which could otherwise happen due to the vibration caused by the previous front tier falling onto the transfer table 16.

It will be appreciated that a bale wagon is provided in which bales can be accumulated and stacked on the load bed in a very stable manner, even though the bales may be stacked on their edges rather than flat as is conventional in certain known automatic bale wagons. The bale wagon according to the present invention also forms more stable stacks even when operating on downward inclines. Thus the invention results in better stacks in the case of a bale wagon of the stacking type, and fewer or no disturbances of the automatic operation during both the loading and unloading cycles. Therefore, the machine has an increased daily output. Also, as the bales now can be stacked on their edges on the load bed, more bales can be loaded than before on a loadbed of predetermined length and width.

What is claimed:

1. In a bale wagon for picking up bales lying in a field and forming a stack thereof having a mobile chassis adapted for movement across the field: a bale pick-up means mounted on the chassis for picking up bales from the ground during movement of the bale wagon across the field; a bale transfer table mounted on the chassis for receiving bales picked up from the ground and forming a tier of bales thereon, said bale transfer table having a rearward edge and a forward edge spaced forwardly of said rearward edge, said forward and rearward edges defining a length for said bale transfer table; and a load bed mounted on said chassis rearward of said bale transfer table adjacent said rearward edge for supporting a stack of bales formed thereon by a plurality of generally upright tiers of bales, each upright tier of bales including a plurality of bales arranged in a generally vertical configuration and having a front face directed toward said bale transfer table, said bale transfer table being moveable between a bale receiving position in which said tier of bales is formed in a generally horizontal position with said front face downwardly against said bale transfer table and a generally vertical bale unloading position in which said tier of bales is transferred to said load bed in said vertical configuration to form said stack of bales, an improved bale transfer table comprising:

a generally curved load surface extending along substantially the entire length of said bale transfer table, said tier of bales being formed on said curved load surface with said front face in contact therewith when said bale transfer table is in said bale receiving position, said load surface being curved generally upwardly when said bale transfer table is in said bale receiving position, such that when said tier of bales is moved onto said load bed in said upright position by said bale transfer table said front face of said upright tier of bales is generally concave in shape.

2. A bale wagon according to claim 1, wherein the curved load surface is generally convex.

3. A bale wagon according to claim 2, wherein the point of maximum curvature of the curved load surface is spaced in the range of 1 inch (2.5 cms) to 3 inches (7.5 cms) from the plane defined by the front and rear edges of the transfer table.

4. A bale wagon according to claim 2, wherein said spacing is in the range of 1.75 inches (4.5 cms) to 2 inches (5 cms).

5. The bale wagon of claim 1 wherein the generally curved load surface of said bale transfer table is constructed of three individually flat members mounted on said bale transfer table at an angle relative to each other, the first flat member being mounted to extend upwardly and rearwardly from said forward edge a distance less than half of said length toward said rearward edge, the second flat member extending upwardly and forwardly from said rearward edge a distance less than half of said length toward said forward edge, the third flat member being positioned between said first and second flat members generally parallel to a plane extending between said forward and rearward edges.

6. A bale wagon of claim 5 wherein said first flat member extends rearwardly a distance approximately equal to one-fourth of the length of said bale transfer table, said second flat member extending forwardly a distance approximately equal to one-fourth of the length of said bale transfer table, said third flat member substantially extending between said first and second flat members.

7. The bale wagon of claim 5 wherein said second flat member includes a transversely extending recess, a transverse bale unloading means being mounted on said bale transfer table within said transverse recess.

* * * * *